(12) United States Patent
Marler

(10) Patent No.: US 10,478,029 B2
(45) Date of Patent: Nov. 19, 2019

(54) EXHAUST-SUPPLIED VACUUM SYSTEM AND APPARATUS

(71) Applicant: Lockheed Martin Corporation, Bethesda, MD (US)

(72) Inventor: Michael Robert Heisaku Marler, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 15/816,006

(22) Filed: Nov. 17, 2017

(65) Prior Publication Data
US 2019/0150684 A1   May 23, 2019

(51) Int. Cl.
| | | |
|---|---|---|
| B23B 45/00 | (2006.01) | |
| B23B 51/00 | (2006.01) | |
| A47L 5/22 | (2006.01) | |
| A47L 5/24 | (2006.01) | |
| B08B 15/04 | (2006.01) | |
| B23Q 11/00 | (2006.01) | |
| B24B 55/10 | (2006.01) | |

(52) U.S. Cl.
CPC .............. A47L 5/225 (2013.01); A47L 5/24 (2013.01); B08B 15/04 (2013.01); B23B 51/00 (2013.01); B23Q 11/0046 (2013.01); B24B 55/10 (2013.01); B24B 55/102 (2013.01)

(58) Field of Classification Search
CPC . Y10T 409/304088; Y10T 409/304144; Y10T 409/306216; Y10T 409/306384; Y10T 409/306496; Y10T 409/306608; Y10T 408/50; B23Q 11/00; B23Q 11/02; B23Q 11/0046; B23Q 11/0071; B23C 1/20; B23C 2230/00; B23B 2270/30; B23B 2270/62; B23B 2260/058; B23B 47/34; B23B 45/00; B23B 45/14
See application file for complete search history.

(56) References Cited

U.S. PATENT DOCUMENTS

| | | | | |
|---|---|---|---|---|
| 2,019,332 A | * | 10/1935 | Tremere | ............... B25D 9/08 173/206 |
| 2,041,689 A | * | 5/1936 | Baumeister | ........ B23Q 11/0046 173/60 |
| 3,442,337 A | * | 5/1969 | Astrom | .............. B23Q 11/0042 173/61 |
| 3,638,737 A | * | 2/1972 | Moates | .............. B23Q 11/0046 173/60 |
| 4,361,957 A | | 12/1982 | Krotz et al. | |
| 4,422,239 A | | 12/1983 | Maier et al. | |
| 4,711,609 A | * | 12/1987 | Seefluth | .............. B23B 51/0413 175/213 |
| D305,607 S | | 1/1990 | Andrews | |

(Continued)

Primary Examiner — Nicole N Ramos
(74) Attorney, Agent, or Firm — Baker Botts L.L.P.

(57) ABSTRACT

In an embodiment, a system includes a tool that includes an exhaust port and a vacuum. The vacuum also includes an exhaust intake port configured to couple to the exhaust port of the tool. The exhaust intake port may be configured to receive exhaust from the exhaust port. The vacuum includes a vacuum intake port, a vacuum exhaust port opposed to the vacuum intake port, and a mixing chamber between the vacuum intake port and the vacuum exhaust port. The vacuum intake port, the vacuum exhaust port, and the mixing chamber may all be on a same centerline.

14 Claims, 4 Drawing Sheets

(56) References Cited

U.S. PATENT DOCUMENTS

| | | |
|---|---|---|
| 5,228,244 A | 7/1993 | Chu |
| 5,560,547 A | 10/1996 | Mutter et al. |
| 5,630,682 A * | 5/1997 | Davey ................... B23B 49/02 408/67 |
| 5,632,579 A | 5/1997 | Susnjara |
| 5,988,954 A * | 11/1999 | Gaskin ............... B23Q 11/0046 408/67 |
| 6,149,511 A | 11/2000 | Huber |
| 6,802,766 B2 | 10/2004 | Liu |
| 7,399,004 B2 | 7/2008 | Wiborg |
| 7,465,132 B2 * | 12/2008 | Gipson ................... A46B 7/04 409/137 |
| 2004/0060719 A1 | 4/2004 | Wiborg |
| 2004/0159451 A1 | 8/2004 | Taga |
| 2004/0247407 A1 * | 12/2004 | Tillemans ............ B23Q 9/0014 409/137 |
| 2010/0316455 A1 | 12/2010 | Sanchez |

* cited by examiner

EXHAUST-SUPPLIED VACUUM SYSTEM AND APPARATUS

TECHNICAL FIELD

The present disclosure relates in general to vacuums, and more particularly to an exhaust-supplied vacuum system and apparatus.

BACKGROUND

A tool may cause debris that may have harmful impacts on a working area. For example, a hand drill may eject particles from a work surface into the air, thereby creating a hazard for workers. To reduce harmful impacts of the debris, a worker must use a vacuum tool to vacuum the work area.

SUMMARY

In an embodiment, a system includes a tool that includes an exhaust port and a vacuum. The vacuum may include an exhaust intake port configured to couple to the exhaust port of the tool. The exhaust intake port may be configured to receive exhaust from the exhaust port. The vacuum may include a vacuum intake port, a vacuum exhaust port opposed to the vacuum intake port, and a mixing chamber between the vacuum intake port and the vacuum exhaust port. The vacuum intake port, the vacuum exhaust port, and the mixing chamber may all be on a same centerline.

Technical advantages of certain embodiments may include preventing debris from getting stuck in a vacuum by positioning the vacuum intake port, the vacuum exhaust port, and the mixing chamber on the same centerline. That positioning may eliminate bends, curves, and other potential obstructions from the debris line. Another technical advantage may include cost savings from reducing the need for a separate technician vacuuming the workspace since the vacuum can be coupled to the tool such that vacuuming can occur while the tool is in use. Vacuuming at the same time as the tool is in use may also increase worker efficiency. Another technical advantage may include a safer work environment because the vacuum may remove debris from the air and floor. Another technical advantage is the ability to 3-d print the vacuum such that the exhaust intake port can be quickly manufactured to fit any tool. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
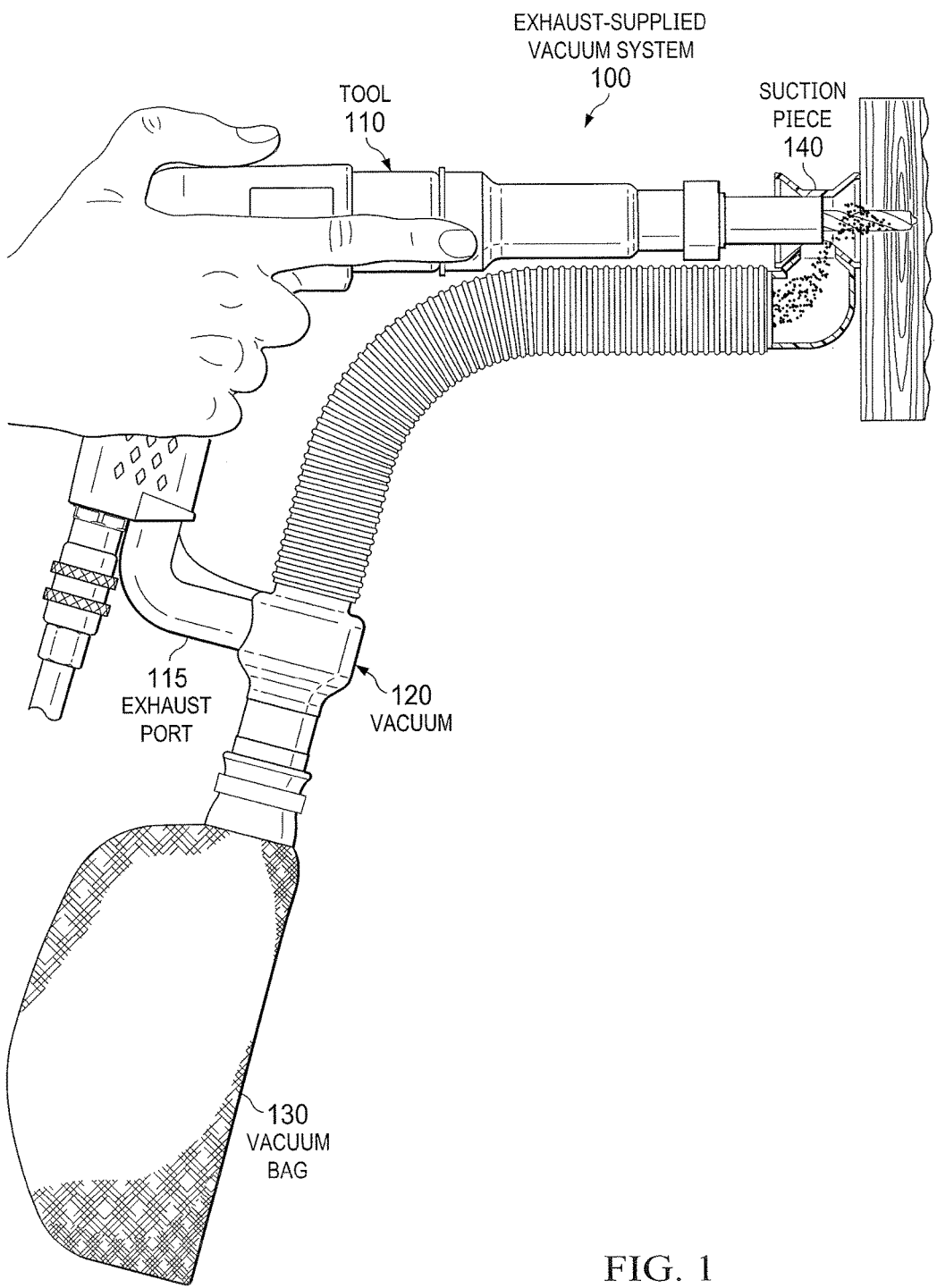
FIG. 1 is a diagram illustrating the exhaust-supplied vacuum system, according to certain embodiments of the present disclosure.

Tools, such as hand drills, may eject debris from a work surface (e.g., a piece of wood). This debris, however, creates workplace safety issues. For example, the debris could get into the eyes or lungs of the workers. As such, users of tools may want to remove the debris from the work environment.

One potential way to reduce the amount of debris is for a worker to use a vacuum separate from the tool to vacuum the debris. That solution, however, is not efficient, because it may require an additional worker to operate the separate vacuum and additional time to vacuum the debris.

To overcome these and other problems, a vacuum may be coupled to the exhaust port of a tool such that the exhaust from the tool powers the vacuum and allows the vacuum to vacuum debris while the tool is in use. Debris may be suctioned through a vacuum intake port, a mixing chamber, and a vacuum exhaust port. To prevent debris from getting stuck in the vacuum, the vacuum intake port, the mixing chamber, and the vacuum exhaust port may have the same centerline. As a result, the vacuum may provide an efficient way to reduce the amount of debris in the work environment.

Accordingly, aspects of the present disclosure include a system that, in one embodiment, includes a tool with an exhaust port and a vacuum. The vacuum may also include an exhaust intake port configured to couple to the exhaust port of the tool. The exhaust intake port may be configured to receive exhaust from the exhaust port. The vacuum includes a vacuum intake port, a vacuum exhaust port opposed to the vacuum intake port, and a mixing chamber between the vacuum intake port and the vacuum exhaust port. The vacuum intake port, the vacuum exhaust port, and the mixing chamber may all be on a same centerline.

Technical advantages of certain embodiments may include preventing debris from getting stuck in a vacuum by positioning the vacuum intake port, the vacuum exhaust port, and the mixing chamber on the same centerline. That positioning may eliminate bends, curves, and other potential obstructions from the debris line. Another technical advantage may include cost savings from reducing the need for a separate technician vacuuming the workspace since the vacuum can be coupled to the tool such that vacuuming can occur while the tool is in use. Another technical advantage may include increasing worker efficiency because vacuuming can be performed at the same time as the tool is in use. Another technical advantage may include a safer work environment because the vacuum may remove debris from the air and floor. Another technical advantage is the ability to 3-d print the vacuum such that the exhaust intake port can be quickly manufactured to fit any tool. Other technical advantages will be readily apparent to one skilled in the art from the following figures, descriptions, and claims. Moreover, while specific advantages have been enumerated above, various embodiments may include all, some, or none of the enumerated advantages.

Figure 2A:
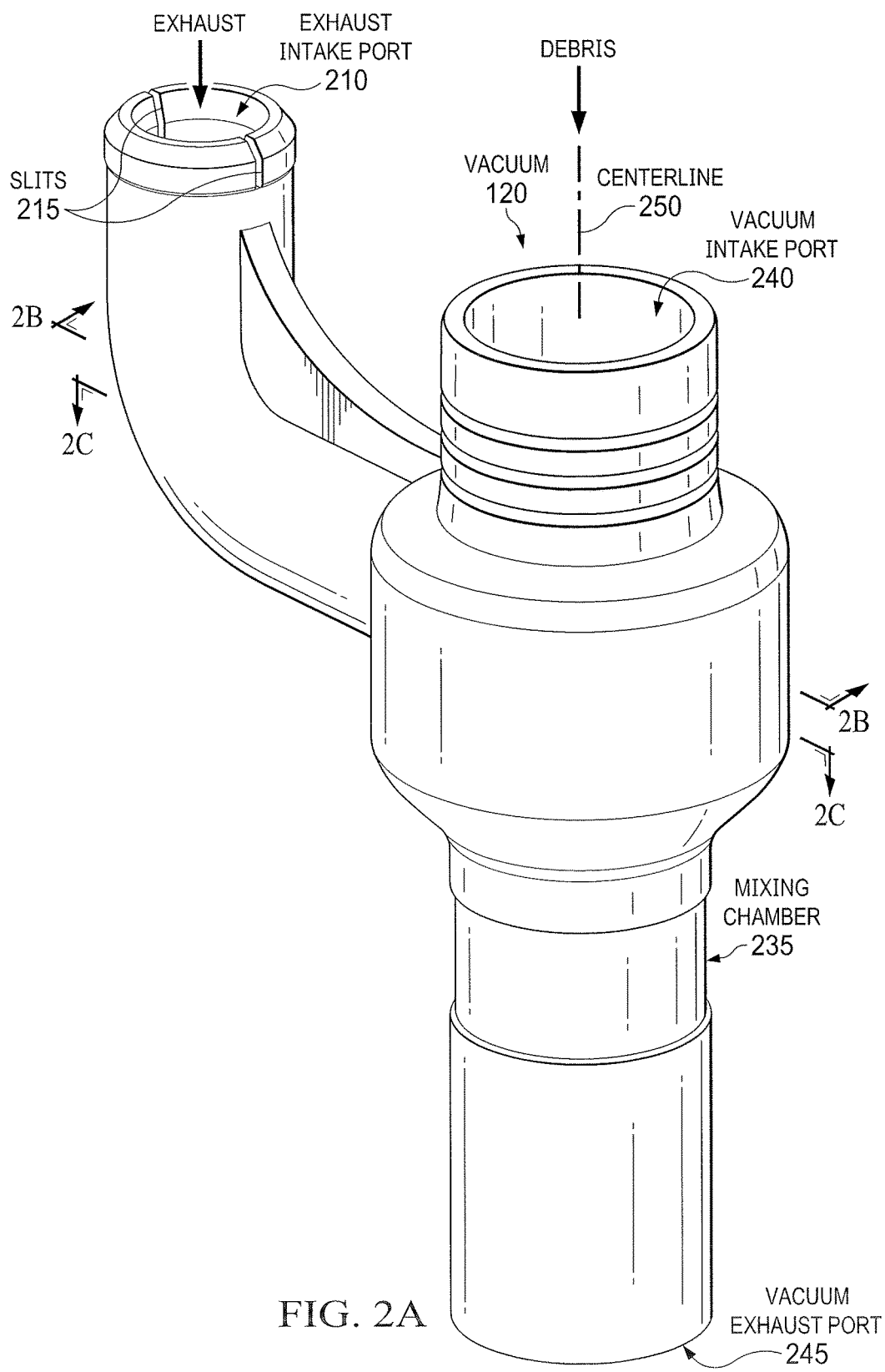
FIG. 2A is a diagram illustrating a perspective view of the vacuum of FIG. 1, according to certain embodiments of the present disclosure.
Figure 2B:
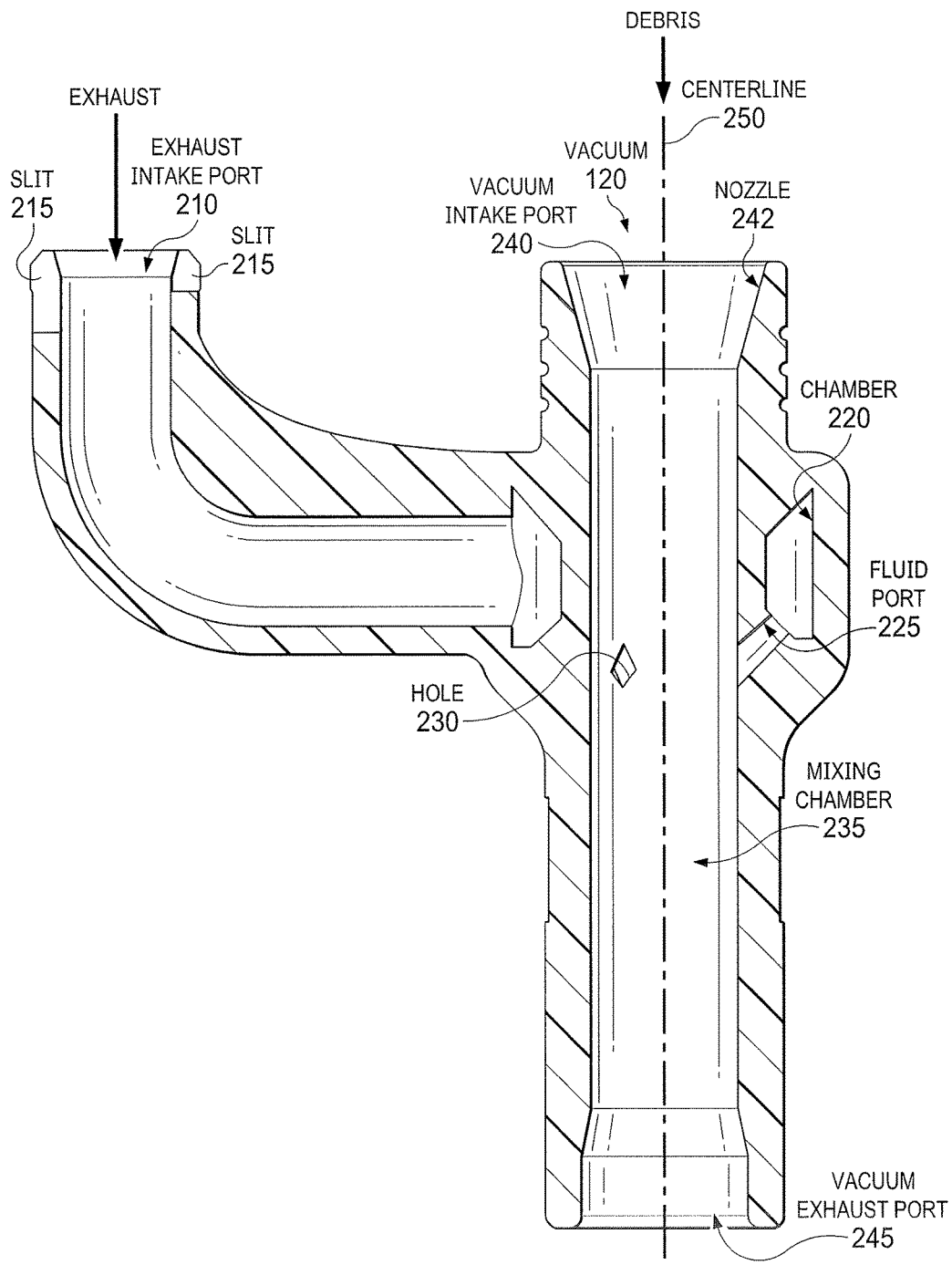
FIG. 2B is a diagram illustrating a section view taken along section 2B-2B of the vacuum of FIG. 2A.
Figure 2C:
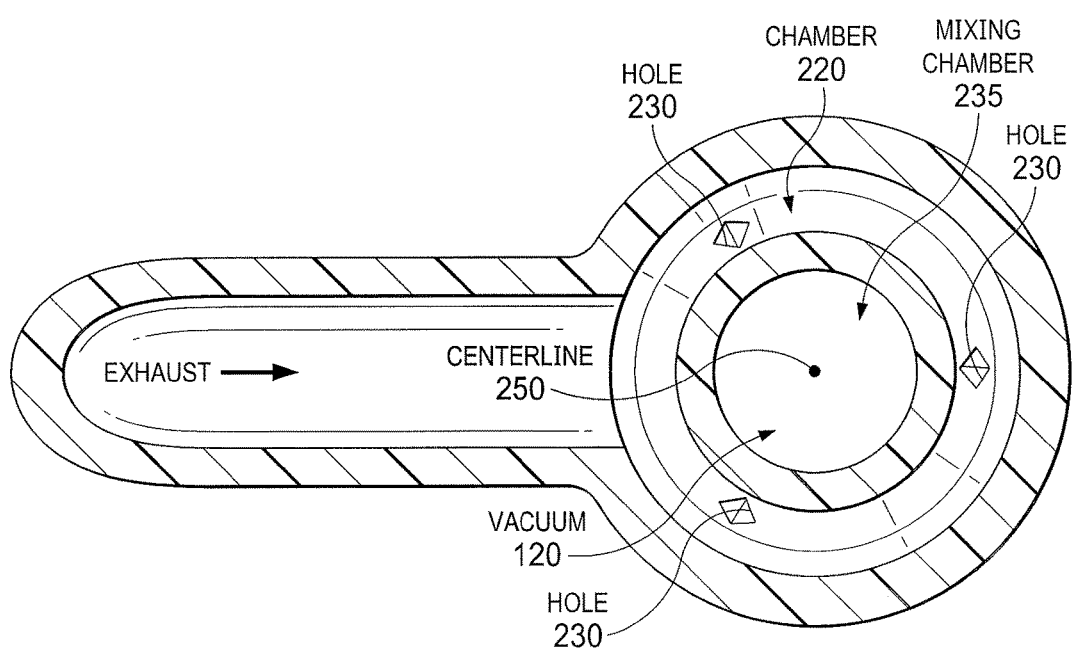
FIG. 2C is a diagram illustrating a section view taken along section 2C-2C of the vacuum of FIG. 2A.

Additional details are discussed with reference to FIGS. 1 through 2C. FIG. 1 illustrates an example exhaust-supplied vacuum system 100 in which an example vacuum 120 may be used. FIG. 2A shows a perspective view of the example vacuum 120. FIGS. 2B and 2C respectively show a section view of the example vacuum 120 taken along section 2B-2B of FIG. 2A and a section view of the example vacuum 120 taken along section 2C-2C of FIG. 2A.

FIG. 1 is a diagram illustrating an exhaust-supplied vacuum system 100, according to certain embodiments of the present disclosure. Exhaust-supplied vacuum system 100 may be used to vacuum particles, chips, or other debris ejected from a work surface by tool 110. For example, exhaust-supplied vacuum system 100 may include a hand drill that creates wood chips that need to be vacuumed. Exhaust-supplied vacuum system 100 may vacuum the chips while the hand drill is in operation. In that example, exhaust-supplied vacuum system 100 may be powered using exhaust supplied by the hand drill. As will be explained below, exhaust-supplied vacuum system 100 may efficiently vacuum particles, chips, or other debris while reducing the potential for clogging. In an embodiment, exhaust-supplied vacuum system 100 may include a tool 110, an exhaust port 115, a vacuum 120, a vacuum bag 130, and a suction piece 140.

Tool 110 may be any tool that has an exhaust port in an embodiment. For example, tool 110 may be a hand drill in an embodiment. As another example, tool 110 could be a sander. Tool 110 may be coupled to vacuum 120 in an embodiment. For example, vacuum 120 may clip in to tool 110. Tool 110 may generate exhaust in an embodiment. Tool 110 may also generate particles, dust, or debris that creates workplace safety issues. Those particles, chips, or debris may need to be vacuumed to alleviate workplace safety issues. As tool 110 is in operation, vacuum 120 may suction particles, chips, or other debris caused by tool 110. Exhaust from tool 110 may power vacuum 120. The exhaust from tool 110 may travel through exhaust port 115 into vacuum 120.

Exhaust port 115 may be an opening of tool 110 through which exhaust from tool 110 travels. Exhaust port 115 may be any shape or size. Exhaust port 115 may couple to exhaust intake port 210 of vacuum 120 in an embodiment. Exhaust from tool 110 may travel through exhaust port 115 into exhaust intake port 210 of vacuum 120 thereby powering vacuum 120.

Vacuum 120 may be a vacuum that is powered by exhaust from tool 110 and has a vacuum intake port 240 and vacuum exhaust port 245 on a same centerline 250 in an embodiment. More detailed aspects of vacuum 120 are discussed below with reference to FIGS. 2A through 2C. Generally, vacuum 120 may be coupled to exhaust port 115 of tool 110, suction piece 140, and vacuum bag 130 in an embodiment. Vacuum 120 may include a plurality of 3-d printed layers in an embodiment. In operation, vacuum 120 is powered by exhaust from exhaust port 115 of tool 110. The exhaust from tool 110 creates a vacuum that causes suction in vacuum 120. Vacuum 120 may suction debris through suction piece 140 into vacuum 120 and vacuum bag 130.

Vacuum bag 130 may be any container that is configured to couple to vacuum 120 and hold particles, chips or other debris suctioned through vacuum 120 in an embodiment. Vacuum bag 130 may couple to vacuum 120 in any manner. For example, vacuum bag 130 may have threads that mate with threads on vacuum 120. In another embodiment, vacuum bag 130 may have a friction fit with vacuum 120. As yet another example, vacuum bag 130 may be glued to vacuum 120. Vacuum bag 130 may be coupled to vacuum 120 at an end of vacuum 120 opposed to an end of vacuum 120 connected to suction piece 140.

Suction piece 140 may be any component that is configured to surround a worksite and suction particles, chips, or other debris into vacuum 120 in an embodiment. Suction piece 140 may be configured to couple to vacuum intake port 240 in an embodiment. Suction piece 140 may have a nose piece that encircles at least a portion of tool 110. For example, suction piece 140 may have a circular nose piece that surrounds a drill bit of tool 110. Suction piece 140 may also have a hose piece through which suctioned particles, chips, or other debris travels to vacuum 120.

As an example embodiment of operation, a worker may use tool 110 on a work surface such that tool 110 generates particles, chips, or other debris that needs to be vacuumed. As tool 110 is in use, tool 110 generates exhaust that powers vacuum 120. As a result of exhaust traveling through exhaust port 115 into vacuum 120, a vacuum is created and causes a suction that suctions the particles, chips, or debris through a suction piece 140 into vacuum 120 and vacuum bag 130. As will be described below, vacuum 120 has a vacuum intake port 240 and vacuum exhaust port 245 on the same centerline 250 so that debris suctioned into vacuum 120 has a clear path to vacuum bag 130 and clogging may be prevented.

FIG. 2A is a diagram illustrating a perspective view of vacuum 120 of FIG. 1, according to certain embodiments of the present disclosure. FIG. 2B is a diagram illustrating a section view taken along section 2B-2B of vacuum 120 of FIG. 2A. FIG. 2C is a diagram illustrating a section view taken along section 2C-2C of vacuum 120 of FIG. 2A. Vacuum 120 is discussed with reference to each of these figures. Generally, in operation, vacuum 120 may receive exhaust from tool 110 through exhaust intake port 210. The exhaust may flow into chamber 220 and through plurality of holes 230, thereby creating a vacuum that causes suction of debris through vacuum intake port 240. In an embodiment, vacuum 120 may include an exhaust intake port 210, slits 215, a chamber 220, a fluid port 225, a plurality of holes 230, a mixing chamber 235, a vacuum intake port 240, a nozzle 242, a vacuum exhaust port 245, and a centerline 250.

Exhaust intake port 210 may be an opening in vacuum 120 configured to receive exhaust from tool 110 in an embodiment. Exhaust intake port 210 may connect to exhaust port 115 of tool 110 in an embodiment. For example, exhaust intake port 210 may clip into exhaust port 115 of tool 110. Exhaust intake port 210 may be in fluid communication with chamber 220 in an embodiment. For example, exhaust intake port 210 may route exhaust from exhaust port 115 of tool 110 to chamber 220. Exhaust intake port 210 may also be in fluid communication with mixing chamber 235 in an embodiment. For example, exhaust intake port 210 may route exhaust from an exhaust outtake of tool 110 through chamber 220, fluid port 225, and plurality of holes 230 to mixing chamber 235. By providing exhaust from exhaust intake port 210 to mixing chamber 235, a low pressure system may be created that supplies vacuum power to vacuum 120. Exhaust intake port 210 may have an opening with a shape designed to match exhaust port 115 of tool 110 in an embodiment. For example, exhaust intake port 210 may have a circular opening where exhaust port 115 of tool 110 is also circular. Exhaust intake port 210 may be a separate opening than vacuum intake port 240 in an embodiment. Exhaust intake port 210 may have one or more slits 215 in an embodiment.

Slits 215 may each be an opening in exhaust intake port 210 in an embodiment. For example, exhaust intake port 210 may have multiple openings extending from an exterior portion of exhaust intake port 210 through an interior portion of exhaust intake port 210. Slits 215 may allow for a more flexible connection between exhaust intake port 210 and an exhaust outtake port of tool 110. Slits 215 may extend vertically along exhaust intake port 210. Slits 215 may be positioned adjacent to an opening of exhaust intake port 210 in an embodiment. Slits 215 may also be positioned proximate to an area of exhaust intake port 210 that connects to the exhaust outtake port of tool 110 in an embodiment. Although exhaust intake port 210 is depicted with two slits 215, exhaust intake port 210 may have any number of slits 215. For example, exhaust intake port 210 may have one or more slits 215.

Chamber 220 may be an opening in vacuum 120 configured to receive exhaust from exhaust intake port 210 in an embodiment. Chamber 220 circumferentially surrounds mixing chamber 235 in an embodiment. For example, chamber 220 may surround at least a portion or all of mixing chamber 235. Chamber 220 may be in fluid communication with exhaust intake port 210 in an embodiment. For example, chamber 220 may receive exhaust from exhaust intake port 210. Chamber 220 may be in fluid communication with plurality of holes 230. For example, exhaust may flow from chamber 220 through each fluid port 225 to a respective one of plurality of holes 230. Chamber 220 may be in fluid communication with mixing chamber 235. For example, exhaust may flow from chamber 220 through fluid port 225 and plurality of holes 230 into mixing chamber 235. Chamber 220 may be positioned proximate to vacuum intake port 240 in an embodiment. For example, chamber 220 may be positioned closer to vacuum intake port 240 than vacuum exhaust port 245. Chamber 220 may be any shape or size in an embodiment.

Fluid port 225 may be an opening or passageway for fluid to flow from chamber 220 to a respective one of plurality of holes 230 in an embodiment. For example, each fluid port 225 may pass exhaust from chamber 220 to a respective one of plurality of holes 230. Vacuum 120 may have a plurality of fluid ports 225 such that there is a one-to-one correspondence between fluid port 225 and each of the plurality of holes 230. For example, vacuum 120 may have a respective fluid port 225 for each of the plurality of holes 230 that connects plurality of holes 230 to chamber 220 (e.g., if there are three holes 230, then there may be three fluid ports 225). Fluid port 225 may be in fluid communication with chamber 220 in an embodiment. For example, fluid port 225 may receive exhaust from chamber 220. Fluid port 225 may also be in fluid communication with mixing chamber 235 in an embodiment. For example, each fluid port 225 may pass exhaust from chamber 220 through a respective one of plurality of holes 230 into mixing chamber 235. Fluid port 225 may be positioned proximate to a bottom portion of chamber 220 in an embodiment. Each fluid port 225 may be positioned at a diagonal angle extending from chamber 220 to each of the plurality of holes.

Plurality of holes 230 may be multiple openings in an interior portion of vacuum 120 that each is in fluid communication with mixing chamber 235 in an embodiment. For example, each of plurality of holes 230 may allow for exhaust from a respective fluid port 225 to travel into mixing chamber 235 through plurality of holes 230.

Mixing chamber 235 may be an open chamber through which debris and exhaust from tool 110 pass in an embodiment. Mixing chamber 235 may extend from vacuum intake port 240 to vacuum exhaust port 245 in an embodiment. Mixing chamber 235 may have the same centerline 250 as vacuum intake port 240 and vacuum exhaust port 245, thereby allowing debris to be suctioned through vacuum 120 using exhaust from tool 110 while reducing the risk that the debris will get stuck in any portion of vacuum 120. For example, by having the same centerline 250, vacuum 120 provides a straight path from vacuum intake port 240 through mixing chamber 235 to vacuum exhaust port 245.

Vacuum intake port 240 may be an opening that is configured to receive debris generated by tool 110 in an embodiment. Vacuum intake port 240 may couple to suction piece 140 in an embodiment. Vacuum intake port 240 may be any shape or size in an embodiment. Vacuum intake port 240 may be positioned at an end of vacuum 120 opposed to vacuum exhaust port 245. Vacuum intake port 240 may have the same centerline 250 as mixing chamber 235 and vacuum exhaust port 245.

Nozzle 242 is a portion of vacuum 120 that may have a varying cross-sectional area in an embodiment. Nozzle 242 may be formed by a cross-sectional area of vacuum 120 that decreases in a direction from vacuum intake port 240 towards mixing chamber 235 in an embodiment. Nozzle 242 may speed the flow of debris into mixing chamber 235 in an embodiment.

Vacuum exhaust port 245 may be an opening that is configured to output debris from vacuum 120 into vacuum bag 130 in an embodiment. Vacuum exhaust port 245 may be positioned at an end of vacuum 120 opposed to vacuum intake port 240. Vacuum exhaust port 245 may be coupled to vacuum bag 130 in an embodiment. Vacuum exhaust port 245 may have the same centerline 250 as mixing chamber 235 and vacuum intake port 240 in an embodiment.

Centerline 250 may be an axis through the center of mixing chamber 235, vacuum intake port 240, and vacuum exhaust port 245 in an embodiment. By mixing chamber 235, vacuum intake port 240, and vacuum exhaust port 245 having the same centerline 250, vacuum 120 provides a straight path from vacuum intake port 240 through mixing chamber 235 to vacuum exhaust port 245. Centerline 250 may therefore allow debris to be suctioned through vacuum 120 using exhaust from tool 110 while reducing the risk that the debris will get stuck in any portion of vacuum 120.

As an example embodiment of operation, vacuum 120 may be coupled to exhaust port 115 of tool 110, vacuum bag 130, and suction piece 140. As tool 110 is operated, exhaust from tool 110 passes into exhaust intake port 210 and into mixing chamber 235 of vacuum 120, thereby creating a vacuum within vacuum 120. This vacuum allows for suctioning of debris caused by tool 110 into vacuum 120. Suctioned debris may pass through vacuum 120 without getting stuck or clogged, because vacuum 120 may have a mixing chamber 235, vacuum intake port 240, and vacuum exhaust port 245 on a same centerline 250.

The present disclosure may provide numerous advantages. For example, a technical advantage may include preventing debris from getting stuck in vacuum 120 by positioning vacuum intake port 240, vacuum exhaust port 245, and mixing chamber 235 on the same centerline 250. That positioning may eliminate bends, curves, and other potential obstructions from the debris line. Another technical advantage may include cost savings from reducing the need for a separate technician vacuuming the workspace since vacuum 120 can be coupled to tool 110 such that vacuuming can occur while tool 110 is in use. Another technical advantage may include increasing worker efficiency because vacuuming can be performed at the same time as tool 110 is in use. Another technical advantage may include a safer work environment because vacuum 120 may remove debris from the air and floor. Another technical advantage is the ability to 3-d print vacuum 120 such that exhaust intake port 210 can be quickly manufactured to fit any tool 110. Other technical advantages will be readily apparent to one skilled in the art from the following figures, descriptions, and claims. Moreover, while specific advantages have been enumerated above, various embodiments may include all, some, or none of the enumerated advantages.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

The invention claimed is:

1. A system, comprising:
    a tool comprising an exhaust port; and
    a vacuum comprising:
        an exhaust intake port configured to couple to the exhaust port of the tool, wherein the exhaust intake port is configured to receive exhaust from the exhaust port;
        a vacuum intake port comprising a nozzle, the nozzle comprising a first end and a second end opposite the first end, the nozzle comprising a cross-sectional area that decreases in a direction from the first end towards the second end;
        a plurality of threads at least partially surrounding the nozzle;
        a vacuum exhaust port opposite the vacuum intake port; and
        a mixing chamber between the vacuum intake port and the vacuum exhaust port; and
    a suction piece configured to couple to the vacuum intake port via a flexible hose, the suction piece comprising a nose piece configured to encircle a portion of the tool;
    wherein:
        the vacuum intake port, the vacuum exhaust port, and the mixing chamber are all on a same centerline;
        the second end of the nozzle is coupled to an end of the mixing chamber that is opposite the vacuum exhaust port; and
        the plurality of threads that at least partially surround the nozzle are configured to couple the flexible hose to the vacuum intake port.

2. The system of claim 1, wherein the vacuum exhaust port is configured to couple to a vacuum bag.

3. The system of claim 1, wherein the exhaust intake port comprises a plurality of slits.

4. The system of claim 1, the vacuum further comprising a chamber configured to receive exhaust from the exhaust intake port, wherein the chamber surrounds at least a portion of the mixing chamber.

5. The system of claim 4, wherein the chamber comprises a plurality of holes.

6. The system of claim 5, wherein each of the plurality of holes in fluid communication with the mixing chamber.

7. The system of claim 1, wherein the exhaust intake pot is configured to clip into the tool.

8. A vacuum, comprising:
    an exhaust intake port configured to couple to an exhaust port of a tool, wherein the exhaust intake port is configured to receive exhaust from the exhaust port;
    a vacuum intake port comprising a nozzle, the nozzle comprising a first end and a second end opposite the first end, the nozzle comprising a cross-sectional area that decreases in a direction from the first end towards the second end;
    a plurality of threads at least partially surrounding the nozzle;
    a vacuum exhaust port opposite the vacuum intake port;
    a mixing chamber between the vacuum intake port and the vacuum exhaust port; and
    a suction piece configured to couple to the vacuum intake port, the suction piece comprising a nose piece configured to encircle a portion of the tool;
    wherein:
        the vacuum intake port, the vacuum exhaust port, and the mixing chamber are all on a same centerline;
        the second end of the nozzle is counted to an end of the mixing chamber that is opposite the vacuum exhaust port; and
        the plurality of threads that at least partially surround the nozzle are configured to couple the flexible hose to the vacuum intake port.

9. The vacuum of claim 8, wherein the vacuum exhaust port is configured to couple to a vacuum bag.

10. The vacuum of claim 8, wherein the exhaust intake port comprises a plurality of slits.

11. The vacuum of claim 8, the vacuum further comprising a chamber configured to receive exhaust from the exhaust intake port, wherein the chamber surrounds at least a portion of the mixing chamber.

12. The vacuum of claim 11, wherein the chamber comprises a plurality of holes.

13. The vacuum of claim 12, wherein each of the plurality of holes is in fluid communication with the mixing chamber.

14. The vacuum of claim 8, wherein the exhaust intake is configured to clip into the tool.

* * * * *